United States Patent [19]

Weichenrieder et al.

[11] 4,427,215
[45] Jan. 24, 1984

[54] PASSIVE LOWER BODY RESTRAINT FOR AUTOMOTIVE VEHICLES

[75] Inventors: Albert Weichenrieder, Geisenfeld; Horst Krammel, Wettstetten; Claude Rion, Ingolstadt, all of Fed. Rep. of Germany

[73] Assignee: Audi NSU Auto Union AG, Neckarsulm, Fed. Rep. of Germany

[21] Appl. No.: 290,507

[22] Filed: Aug. 6, 1981

[30] Foreign Application Priority Data

Aug. 7, 1980 [DE] Fed. Rep. of Germany ....... 3029913

[51] Int. Cl.³ .............................................. B60R 21/04
[52] U.S. Cl. .................................... 280/752; 180/90; 296/37.12
[58] Field of Search ...................... 280/748, 751, 752; D12/192; 296/37.12; 180/90

[56] References Cited

U.S. PATENT DOCUMENTS

| 2,571,627 | 10/1951 | Sloman et al. | 280/752 X |
| 3,602,327 | 8/1971 | Barenyi | 280/752 X |
| 3,774,713 | 11/1973 | Stegmaier | 280/752 X |
| 3,876,228 | 4/1975 | Hawkins et al. | 280/752 |
| 3,964,578 | 6/1976 | Campbell et al. | 280/752 X |
| 3,966,227 | 6/1976 | Cameron | 280/752 |
| 4,061,365 | 12/1977 | Nagano et al. | 280/751 X |
| 4,320,909 | 3/1982 | Nakamori | 280/752 |

FOREIGN PATENT DOCUMENTS

| 1630328 | 8/1971 | Fed. Rep. of Germany . |
| 2054031 | 5/1972 | Fed. Rep. of Germany . |
| 2104388 | 8/1972 | Fed. Rep. of Germany . |
| 2324571 | 11/1973 | Fed. Rep. of Germany . |
| 2407178 | 9/1975 | Fed. Rep. of Germany . |
| 2510725 | 9/1976 | Fed. Rep. of Germany . |
| 2634222 | 2/1978 | Fed. Rep. of Germany . |

Primary Examiner—Joseph F. Peters, Jr.
Assistant Examiner—Michael Mar
Attorney, Agent, or Firm—Karl F. Ross; Herbert Dubno

[57] ABSTRACT

A passive knee restraint for an automotive vehicle is formed by the yieldable rearwardly facing lower wall of a dashboard portion positioned to engage the knees of a seated passenger in an automotive vehicle, thereby restraining the lower portion of the body of the passenger in the seat in the event of sudden vehicle deceleration. According to the invention, this dashboard portion is at least partly swingable on the remainder of the dashboard to afford unrestricted access to the region behind it, thereby allowing repair and maintenance in this region and/or access to articles stored therein as, for example, when a glove compartment is provided behind this swingable part.

4 Claims, 5 Drawing Figures

PASSIVE LOWER BODY RESTRAINT FOR AUTOMOTIVE VEHICLES

FIELD OF THE INVENTION

Our present invention relates to a safety system for automotive vehicles, especially passenger vehicles, and more particularly to a passive restraint for the lower portion of the body effective while the passenger is seated on a front seat of an automotive vehicle having a dashboard spaced ahead of this seat.

BACKGROUND OF THE INVENTION

The safety devices available for front seat passengers (this term being used to include the driver) of an automotive vehicle may be divided in two types, namely, the passive restraint and active restraint.

An active restraint generally comprises a member which is movable and is activated upon sudden deceleration of the vehicle, e.g. as a result of a collision, to present a surface to the passenger which prevents a rapid movement of a portion of the body of the passenger toward the dashboard or windshield of the vehicle. Typical of such active restraints are inflatable bags, belts which are activated upon collision, and movable members which can be swingable on the floor of the vehicle, on the seat or on the steering column to intercept the forwardly moving body of the passenger.

Passive restraints, by contrast, generally need not be activated by collision or sudden deceleration, and are positioned to retain a portion of the body in place. Such restraints include seat belts which can be non-yieldable.

While the art is aware of numerous restraints for the upper portion of body, designed principally to prevent the head of the passenger from impacting upon the windshield, it is also vital that lower body restraint be provided to prevent the lower portion of the torso from sliding forwardly on the seat and causing significant injury to the passenger in the event of a collision or the like.

It is known, in this connection, to provide a restraint for retaining the lower portion of the torso on the front seat of the vehicle against a tendency for this portion of the passenger's body to shift forwardly by disposing in the region of the knees of the passenger and providing this member with an energy-dissipating yieldable surface which gives as the passenger tends to be thrown forwardly.

In German patent document 23 24 571, for example, this member occupies considerable space and renders the region forwardly of the member, i.e. the portion of the dashboard behind the surface of the member confronting the passenger, substantially inutile and inaccessible, e.g. for repair or maintenance purposes.

The German patent document 25 10 725 discloses an adjustable restraining member which is coupled to the vehicle seat and is adjustable in height depending upon the position of the seat. In this case as well the restraining member limits seriously access to the region of the passenger compartment directly ahead of the member.

OBJECTS OF THE INVENTION

It is the principal object of the present invention to provide an improved passive restraint for an automotive vehicle in which the disadvantages of the aforedescribed systems are obviated.

Another object of this invention is to utilize more effectively the passenger compartment space of an automotive vehicle.

Still another object of the invention is to provide a safety device which also enables a repair and maintenance operations to be carried out without difficulty.

SUMMARY OF THE INVENTION

These objects and others which will become apparent hereinafter are attained, in accordance with the present invention, in an automotive vehicle comprising a vehicle body having a passenger compartment with a dashboard at a front portion thereof, at least one front seat spaced rearwardly of the dashboard, and a passive restraint member mounted on the dashboard and formed with a surface positioned with respect to this seat so as to engage the knees of a passenger and formed with a yieldable energy-dissipating surface for retaining the lower portion of the torso of the passenger upon the seat, this member being at least in part pivotally mounted directly upon the dashboard so as to be swingable between its restraint position and a position in which access is afforded to the portion of the passenger compartment forwardly of this member in an unrestricted manner.

Because all or a portion of the restraining member is swingable, access to the space behind this member is facilitated for repair, maintenance or storage purposes. Thus, for example, this space may be formed as a glove compartment, tool compartment, or may be a compartment or another storage area for accessories necessary to the passenger or to the vehicle. Alternately, the space may be utilized for elements requiring comparatively simple acces, e.g. the vehicle fuse block.

In many vehicles, especially compact automobiles in which passenger compartment space is at a premium, the space behind the knee-engaging surface can be used to accommodate another safety device such as an active restraint, e.g. a gas bag. A gas or air bag can also be provided above the knee restraint.

A particular advantage in forming the swingable member or the swingable portion of the knee-engaging member as the door of the glove compartment is that both functions can be performed by a single element while stylistic considerations can govern the appearance of the dashboard region in spite of the compact construction of the restraint.

According to another feature of the invention, the swingable portion of the knee-engaging restraining element is swingable on hinge pins while on the side opposite the hinge, with a predetermined pressure against the restraining element, the movable member can hook into the dashboard and the movable member thereby is stabilized for energy-dissipation resulting from the forward movement of the passenger. This hooking action can be achieved by forming the restraining member with an S-shaped profile engaging in a complementary shaped part of the dashboard. With this hooking action, even if the hinge pins should shear or the hinge should be damaged in another manner, the movable member will resist forward displacement and be available to act as a restraint in a manner described.

It has been found to be especially advantageous to subdivide the restraining member into left and right portions by a console rising from the floor passenger compartment and forming guide surfaces against which knees of the individuals to either side of the console can rest. In this case, the abutment members engageable with the knees of the passengers to either side of the console can be formed as one-piece elements, each of which may be swingable in the manner described. The swingable member on the right-hand side of the console can, for example, form the cover of a glove compartment while the swingable member of the left-hand side of the console can form the cover of a compartment containing fuses or other elements requiring maintenance or service or serving for other storage purposes. The guide surfaces forming the flanks of the console guarantee that the knees of the passengers will always be juxtaposed with the restraining members.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
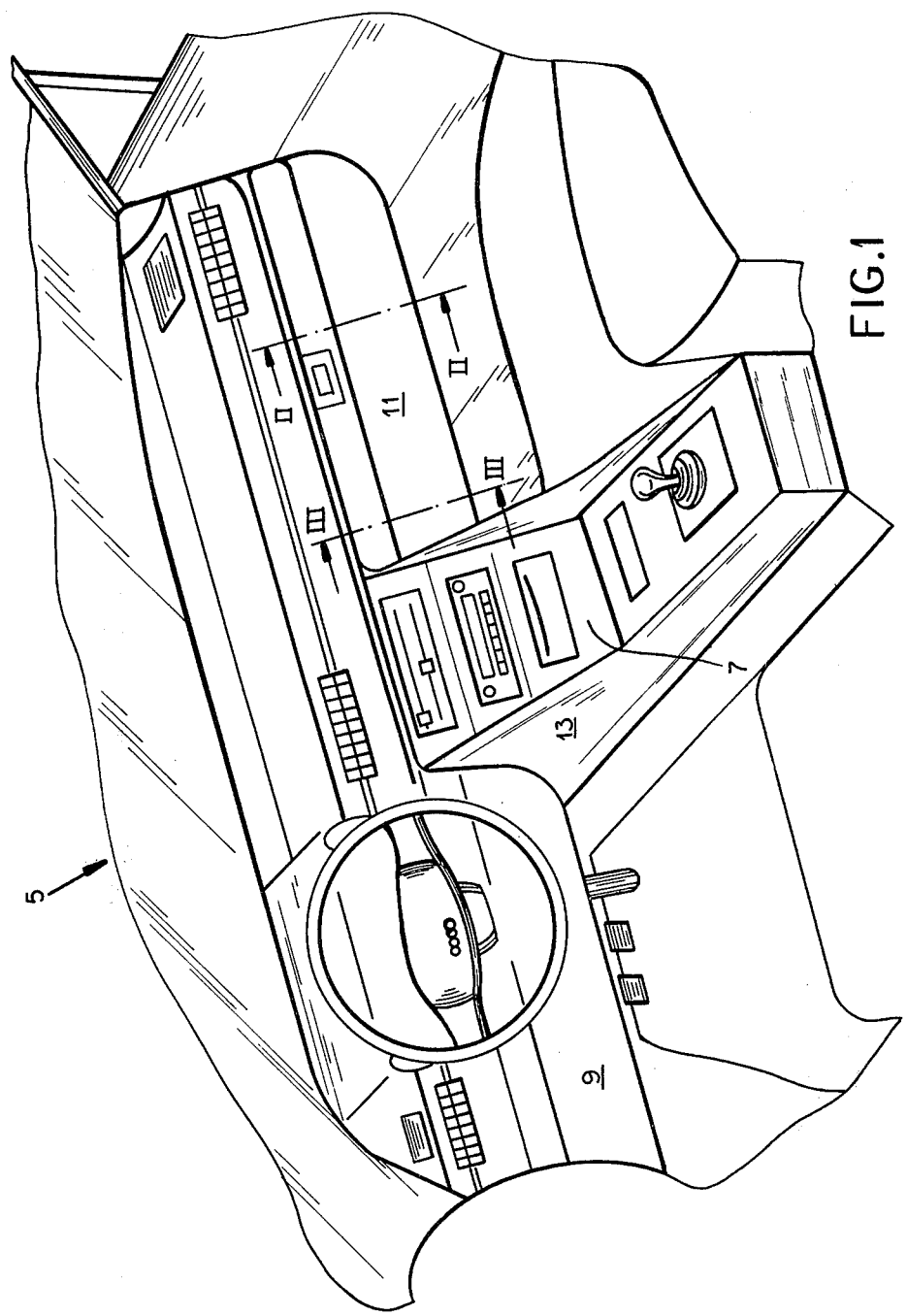
FIG. 1 is a diagrammatic perspective view of the front of a passenger compartment of an automotive vehicle formed with the safety system of the instant invention.

The dashboard 5 of the passenger compartment of the automotive vehicle shown in the drawing is connected to a central console 7 which can be provided with a shift lever, radio or cassette player, controls for heating and cooling purposes and a storage or accessory compartment in accordance with conventional principles.

To the left and right of this console, the dashboard is formed with respective safety or restraining members 9 and 11 which may have smaller cross sections (see FIGS. 2 and 3) and which are convex toward the passenger and yieldable by virtue of being formed of flexible material.

These members are positioned so that they engage the knees of the passengers seated on the front seats of the vehicle. These restraints can be provided in addition to seat belts forming a passive restraint or air bags providing an active restraint and serving to hold the upper portion of the torso of each passenger against the back of the seat in an emergency condition.

To ensure that the knees of the front passengers will be contacted by the restraining members 9 and 11 even if the passengers tend to slouch, the console 7 is formed with a pair of flanks 13 which guide the inner leg of each passenger toward the respective restraining member 9 or 11.

While both members may be swingable in the manner to be described below, the left-hand member 9 can also be fixed to the dashboard while the right-hand member 11 is swingable downwardly to afford access to a glove compartment.

Figure 2:
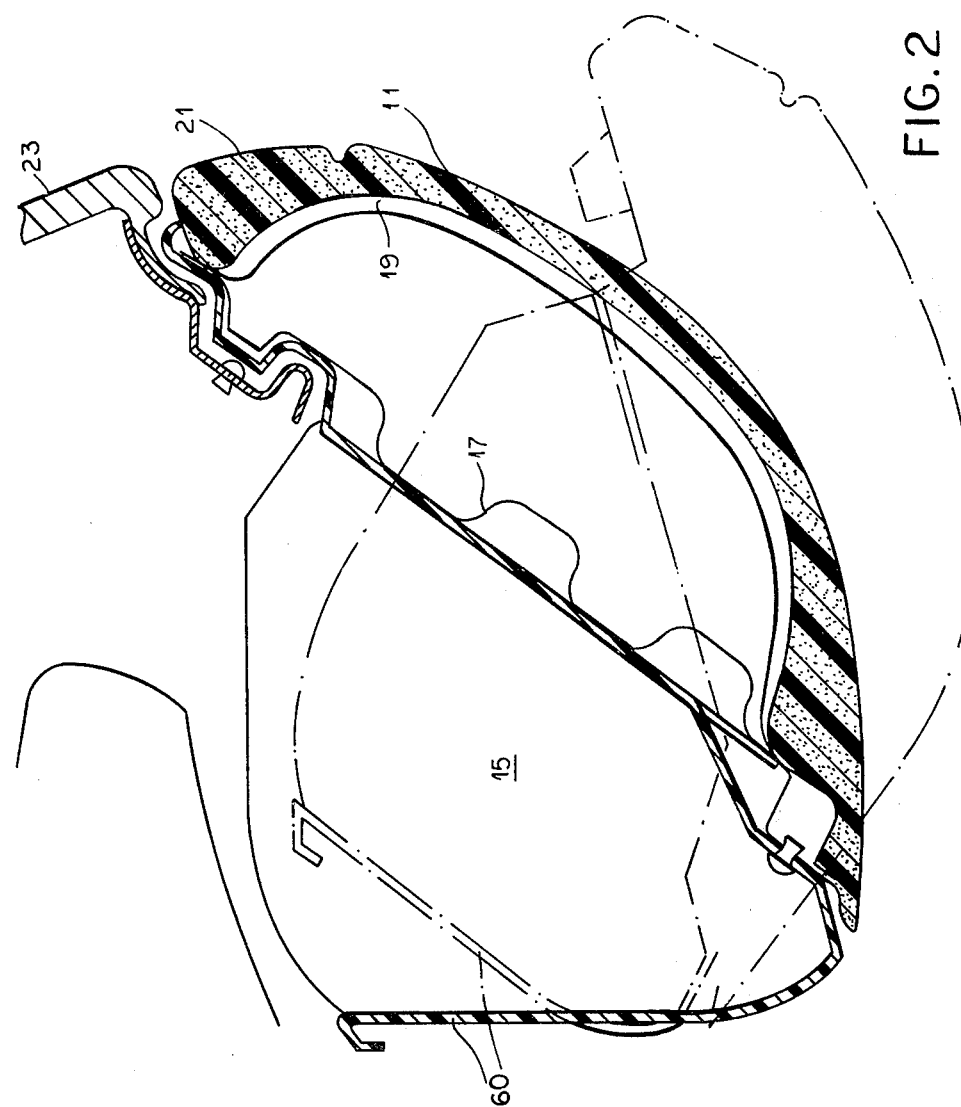
FIG. 2 is a section taken along the line II—II of FIG. 1.
Figure 3:
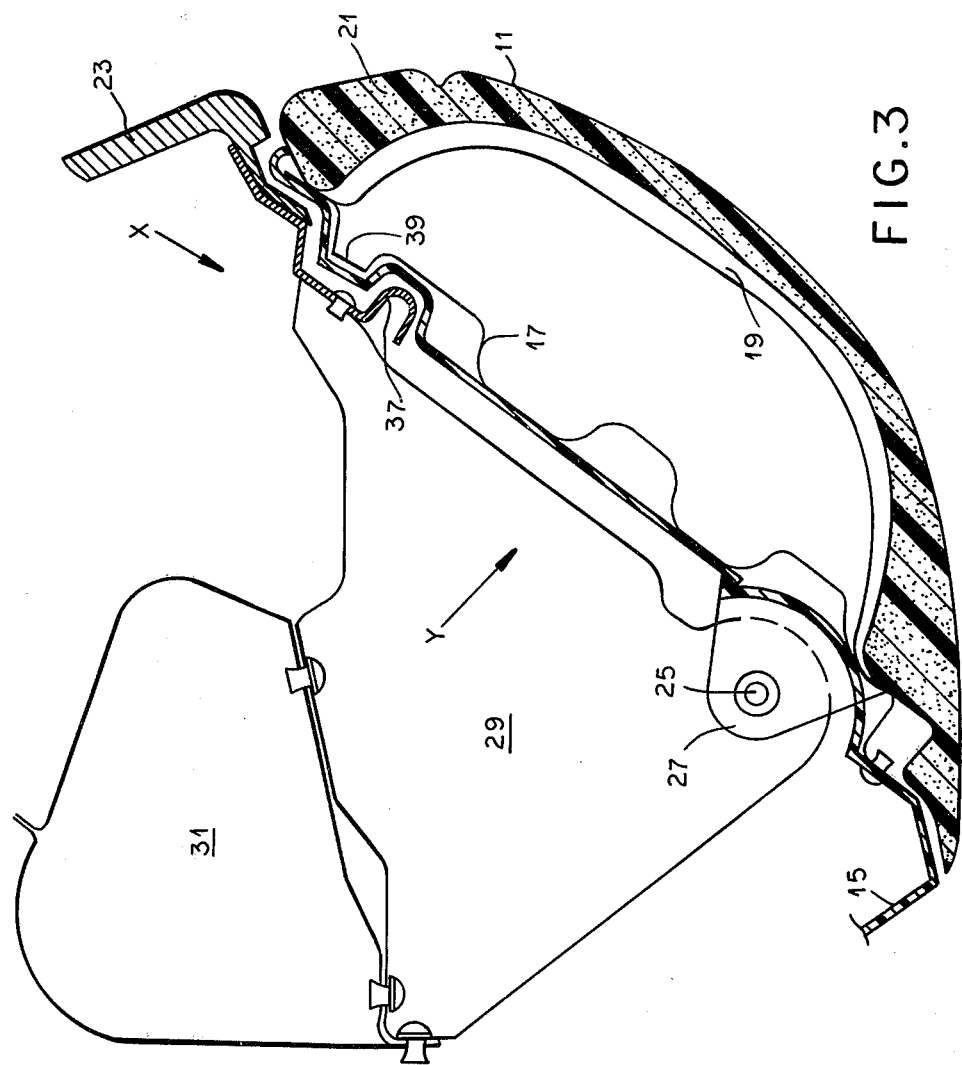
FIG. 3 is a section taken along the line III—III of FIG. 1.
Figure 4:
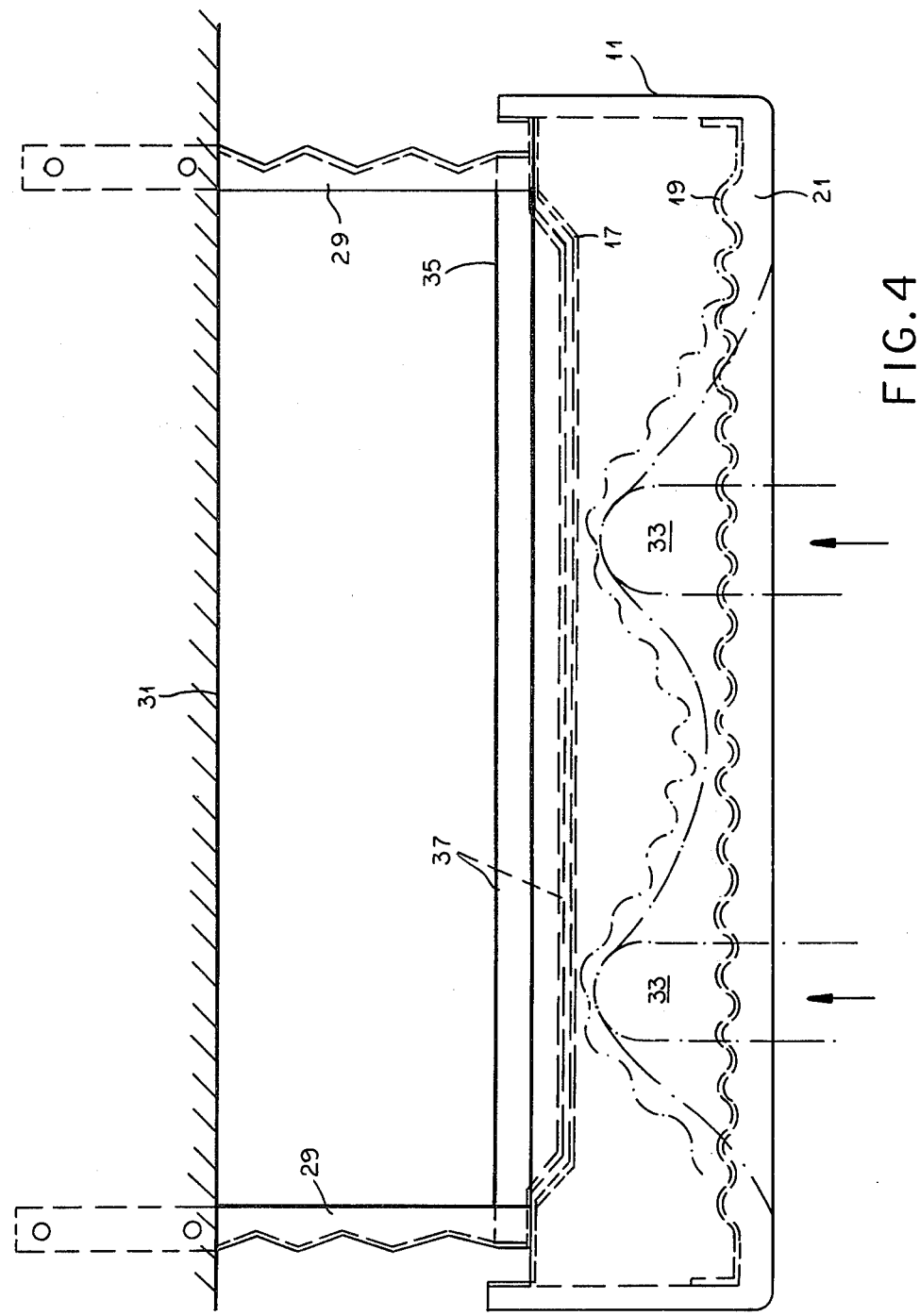
FIG. 4 is a view in the direction of arrow X in FIG. 3 also in diagrammatic form.
Figure 5:
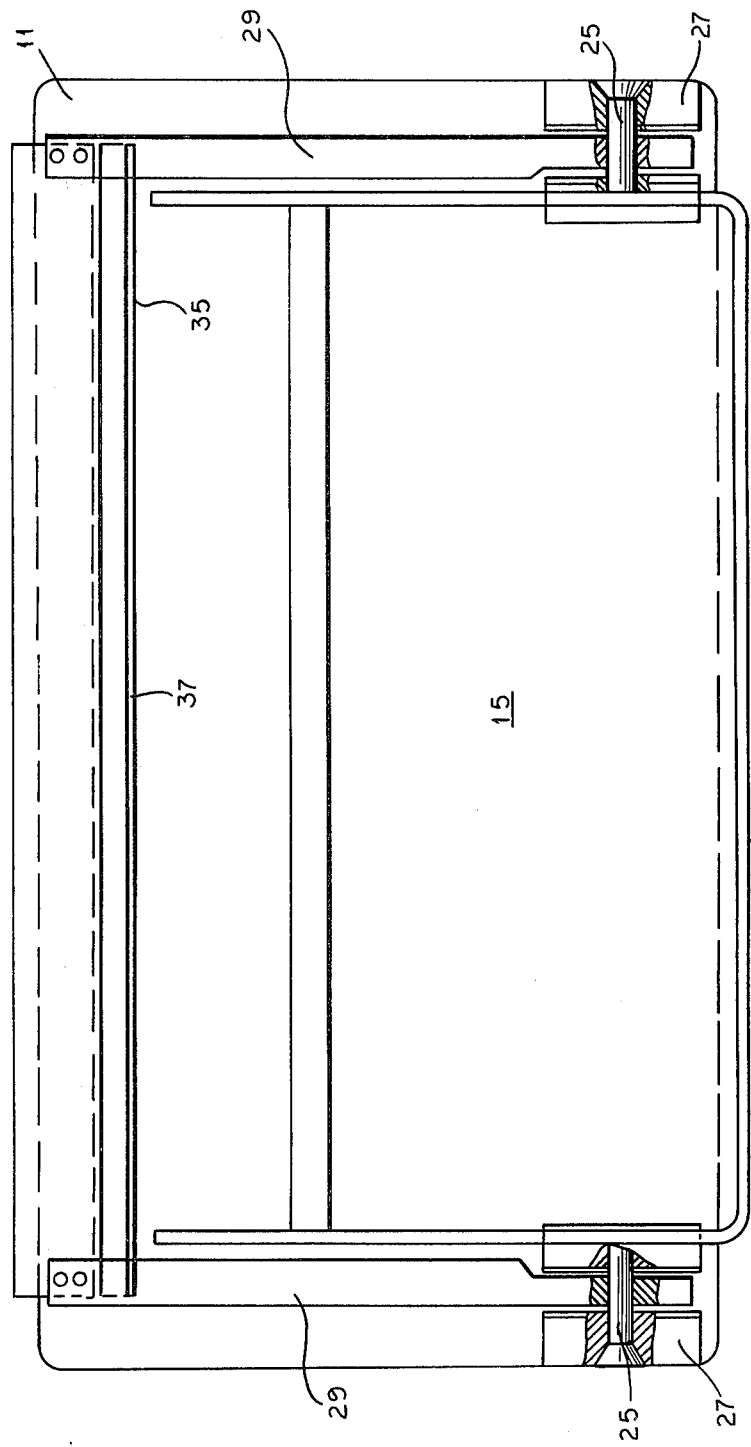
FIG. 5 is a view in the direction of arrow Y of FIG. 3.

As can be seen from FIGS. 2 and 3, where the glove compartment is shown in an enlarged cross-sectional form, the member 11 can comprise a ribbed transverse carrier 17 of sheet metal, this corrugated member being provided with an energy-dissipating deformable portion 19 which is internally corrugated or ribbed as diagrammatically shown in FIG. 4.

The exterior surface of the deformation member 19 is covered with a foamed synthetic resin cushion 21 which in color and texture conforms to that of the covering 23 of the remainder of the dashboard.

The member 11 also is connected to a box-shaped portion 60 of synthetic resin which forms the glove compartment when member 11 is swung downwardly into the position shown in dot-dash lines in FIG. 2.

The hinged connection of member 11 to the dashboard 5 will be apparent from FIGS. 2 and 3, the hinged connection being formed by pins 25 which pass through lugs 27 on the member 11 and into brackets or plates 29 of the dashboard. The brackets 29 are connected by rivets to a carrier 31 of the chassis or body of the vehicle. As a result, force impressed upon member 11 is transmitted directly to the body.

In FIG. 4 shown at 33 the knees of the passenger engage the deformable portion 19 of the restraining member 11 and can press into the latter until the deformable member engages the corrugated support 17.

As is apparent from FIG. 4, the deformation is local and thus the resisting force is spread over both the front and sides of the knee and lateral shifting of the knees is prevented.

When such pressure is applied in an emergency, the member 11 is supported by a three-sided open and energy-dissipating frame 35 formed by the holder 29 and a detent bar 37 by which the energy is transmitted to the carrier 31 on the vehicle body.

A bar 37 form-fittingly is engaged by an S-shaped projection 39 on the transverse member 17 of the restraining element 11 to prevent a shifting of member 11 relative to the frame, thereby ensuring high energy absorption capacity.

We claim:

1. In an automotive vehicle having a passenger compartment, a dashboard at a front seat in said compartment spaced from said dashboard, the improvement which comprises the combination therewith of a restraining member affixed to a lower portion of said dashboard, said restraining member being positioned to engage the knees of a passenger seated on said seat for restraining forward movement of the lower portion of the torso of said passenger, said restraining member being composed of a body deformable by the knees of said passenger to dissipate energy of forward movement of the passenger, hinge means for swingably mounting of at least a portion of said member upon said dashboard at one side of said member to afford access to a region behind said portion, and a profile portion on an opposite side of said member form-fittingly hooking into a complementary portion on said dashboard to prevent relative slipping of said member and said dashboard upon the application of force to said member by the knees of said passenger.

2. The improvement defined in claim 1 wherein said portion forms the cover of a glove compartment of the vehicle in said region.

3. The improvement defined in claim 1 or claim 2 wherein said passenger compartment is provided with a central console and said member is provided on one side of said console, said console being formed with a guide flank on said side of said console for directing the knees of a passenger toward said member.

4. The improvement defined in claim 3, further comprising another restraining member mounted on said dashboard on the opposite side of said console for engagement with the knees of another passenger in a front seat of said vehicle.

* * * * *